United States Patent [19]
Heiser

[11] Patent Number: 5,818,430
[45] Date of Patent: Oct. 6, 1998

[54] TOUCH SCREEN

[75] Inventor: Brian Heiser, East Norwich, N.Y.

[73] Assignee: C.A.M. Graphics Co., Inc., Amityville, N.Y.

[21] Appl. No.: 789,197

[22] Filed: Jan. 24, 1997

[51] Int. Cl.⁶ ................................................. G09G 5/00
[52] U.S. Cl. .......................................... 345/174; 178/18
[58] Field of Search ..................... 178/18, 19; 345/156, 345/157, 173, 174, 176, 177; 341/22, 32, 33, 34

[56] References Cited

U.S. PATENT DOCUMENTS

| | | | |
|---|---|---|---|
| 3,632,874 | 1/1972 | Malavard et al. | 178/18 |
| 3,798,370 | 3/1974 | Hurst | 178/18 |
| 3,911,215 | 10/1975 | Hurst et al. | 178/200 |
| 4,821,029 | 4/1989 | Logan et al. | 345/173 |
| 4,846,694 | 7/1989 | Erhardt | 434/345 |
| 4,897,511 | 1/1990 | Italy et al. | 178/18 |
| 4,899,292 | 2/1990 | Montagna et al. | 395/345 |
| 4,914,624 | 4/1990 | Dunthorn | 395/345 |
| 4,928,094 | 5/1990 | Smith | 345/250 |
| 4,990,725 | 2/1991 | Mizzi | 178/18 |
| 5,553,296 | 9/1996 | Forrest et al. | 395/364 |
| 5,668,353 | 9/1997 | Matsuda et al. | 345/174 |

*Primary Examiner*—Dennis-Doon Chow
*Attorney, Agent, or Firm*—Steinberg & Raskin, P.C.

[57] ABSTRACT

An touch screen of the voltage-divider type is provided which includes two substrates spaced apart from each other by a gap, each substrate including a region formed of conductive material formed in overlapping relationship to each other. A pair of strips formed from a resistive material is coupled to opposed edges of each conductive region such that the resistance strips of the first substrate extend in a substantially perpendicular direction to the resistance strips of said the second substrate. A circuit is provided which applies a first reference voltage across the resistance strips of the first substrate, and subsequently applies a second reference voltage across the resistance strips of the second substrate.

13 Claims, 2 Drawing Sheets

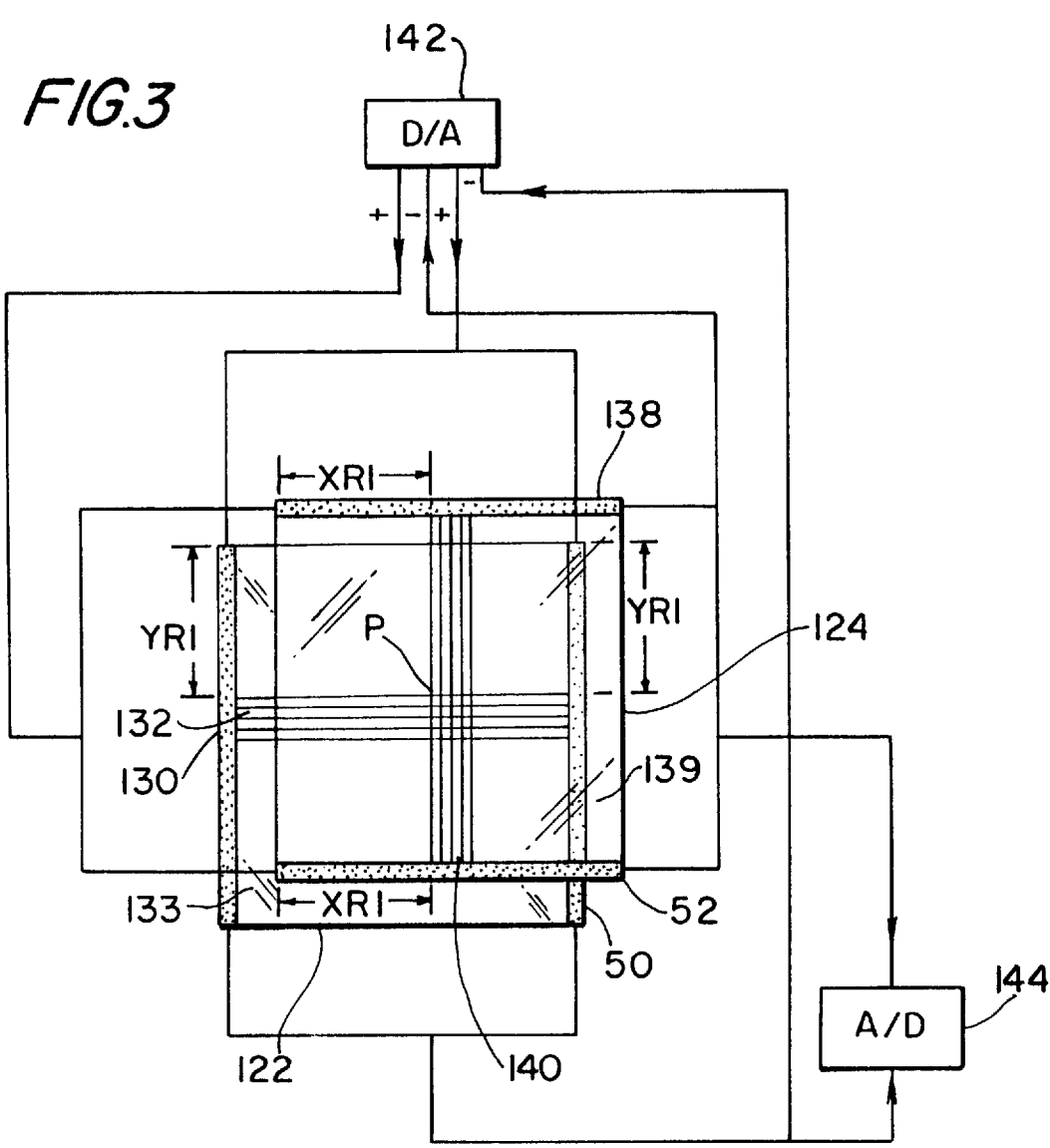
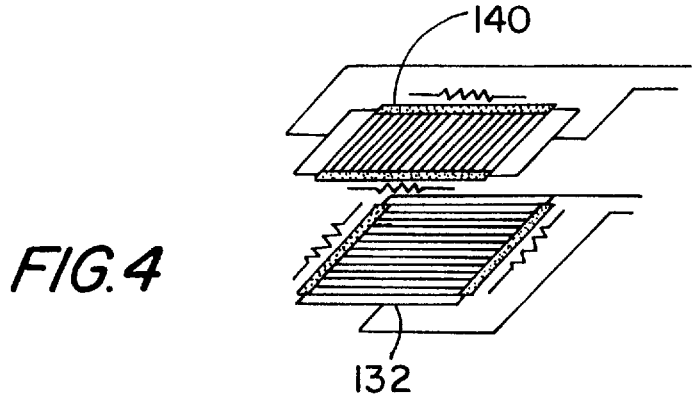

TOUCH SCREEN

FIELD OF THE INVENTION

The present invention relates generally to touch screens and, more particularly, to touch screens of the voltage-divider type.

BACKGROUND OF THE INVENTION

Touch screens of the voltage-divider type which are able to detect a contacting position in a touch panel sensor are known. Such conventional touch screens comprise a pair of substrates (an "X substrate" and a "Y substrate") spaced from each other by a gap, and on each of which a layer or region of resistive material is provided. A pair of lines formed of conductive material are provided at opposed edges of each of the resistance layers. The resistance layers face each other in overlapping relationship with the conduction lines of one substrate extending in a generally perpendicular direction to the conduction lines of the other substrate. Digital to Analog (D/A) circuitry is provided by which voltage is applied and switched between the respective substrates through their respective conduction lines so that one substrate (active) is coupled between 5 volts and ground and the other is unconnected (inactive). When the touch panel is depressed at a point in its active area, i.e., the area over which the resistance layers overlap, the resistance layers flex into engagement at a particular point, and a voltage indicative of the Y coordinate is read from the X substrate utilizing Analog to Digital circuitry. Then the applied voltage is switched from the Y substrate to the X substrate, and a voltage indicative of the X coordinate is read from the Y substrate in the same manner. When voltage is applied to a given substrate, the resistive layer on the substrate acts as a voltage divider, and the other substrate acts like a wiper arm of a potentiometer such that the coordinate position of the contacting point can be detected.

A problem with the design of the conventional touch screen is that the touch screen's life and positional accuracy are dependent upon maintaining the uniformity of the resistance of each layer. That is, if the resistive surface is scratched slightly during manufacture or if the final touch screen is cut (e.g. with a blade), such excessive use or abuse will change the resistance in the effected areas, thus compromising the uniformity and positional accuracy of the screen. In addition, conventional touch screens are limited by the availability of standard coatings and the geometry of the touch screen. Lastly, because the properties of the coating vary at different rates, the voltage distribution is affected and positional drift occurs near the edges of the touch screen creating a constant need for recalibration.

In order to alleviate the problems inherent in the conventional touch screen discussed above, a voltage-divider type touch screen has been suggested in which the resistive material which acts as the voltage-divider is condensed and restricted to an area on the perimeter of each substrate forming the touch screen (i.e., in the inactive area) in the form of resistance strips, rather than providing resistive material on the face of each substrate. In this prior art touch screen, as opposed to the conventional touch screen discussed above, rows of conductive strips are formed on each substrate defining a conductive region or layer. Thus, instead of the active resistance layer acting as the voltage-divider, the resistance strip in the inactive area of the touch screen acts as the voltage-divider, such that the coordinate position of the contacting point can be detected.

Since the resistance of the active area of each substrate is negligible (i.e., the area over which the conductive layers overlap), the touch screen's life and positional accuracy are no longer dependant upon maintaining the uniformity of the resistance of each layer. Thus, the fact that the properties of the conductive coating vary at different rates does not have a negative affect on the voltage distribution. In addition, since the conductive rows are etched in fine lines on the substrates rather than coated uniformly thereon, the positional drift which occurred near the edges of the conventional touch screen is eliminated.

OBJECTS AND SUMMARY OF THE INVENTION

While the above-referenced prior art device alleviated some problems inherent in the conventional touch screen, problems remain to be solved. For example, if the active area of the touch screen is scratched slightly during manufacture or if the screen is cut, the screen will be rendered useless because the conductive strips in the damaged area will be disconnected from the resistance strip.

It is an object of the present invention to provide a new and improved touch screen of the voltage-divider type which is reliable and whose positional accuracy and life are unaffected by physical abuse by providing an additional resistance strip to each substrate.

In accordance with the present invention, a touch screen is provided which includes a pair of substrates spaced apart from each other by a gap. A pair of strips formed from a resistive material are situated at the opposing edges of each substrate such that the resistance strips of the first substrate extend in a substantially perpendicular direction to the resistance strips of the second substrate. A plurality of conductive strips defining conductive regions or layers on the substrates are coupled at their ends to each resistance strip of each substrate. The conductive layer of the first substrate faces the conductive layer of the second substrate in an overlapping relationship.

When a touch occurs in the active area of the touch screen, i.e., the area over which the conductive layers overlap, causing the two layers to be brought into contact with each other at the touch point, the precise coordinates of the localized touch point along the vertical axis (i.e., the Y coordinate) and the horizontal axis (i.e., the X coordinate) are determined. In accordance with the present invention, a reference voltage is applied across the resistance strip of the first substrate while a voltage indicative of a first coordinate (e.g., the Y coordinate) is read from the second substrate. Then the reference voltage is applied across the resistance strip of the second substrate while a voltage indicative of a second coordinate (e.g., the X coordinate) is read from the first substrate. If a discontinuity exists at a point on one or more of the conductive strips, the current will still flow to the resistance strip on the other edge thereby allowing the touch screen to function properly.

BRIEF DESCRIPTION OF THE DRAWINGS

A more complete appreciation of the present invention and many of the attendant advantages thereof will be readily understood by reference to the following detailed description when considered in connection with the accompanying drawings in which:

FIG. 3 is a schematic diagram of a touch screen of the voltage-divider type in accordance with the present invention; and FIG. 4 is a perspective view showing the arrangement shown in FIG. 3.

DETAILED DESCRIPTION OF THE INVENTION

Figure 1:
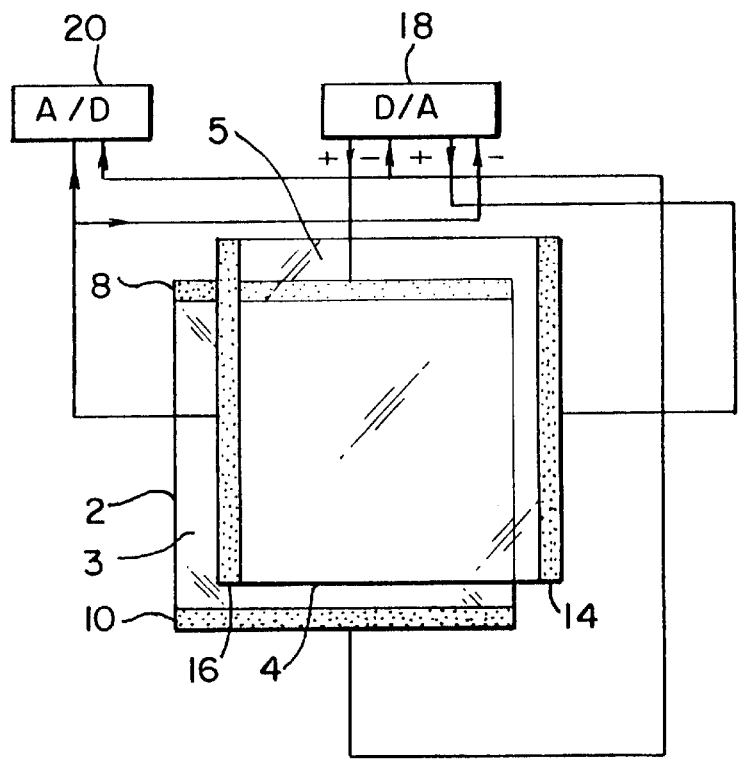
FIG. 1 is a schematic diagram of a conventional touch screen of the voltage-divider type having an active area defined by a pair of opposed resistance layers as provided by the prior art.
Figure 1A:
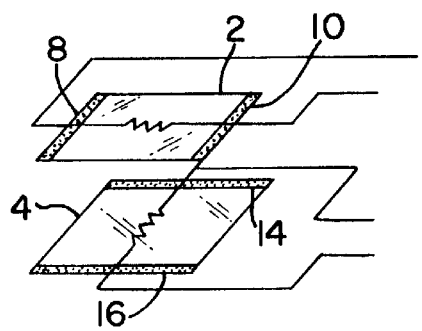
FIG. 1a is a perspective view showing the arrangement shown in FIG. 1.

Referring now to the drawings where like references characters designate identical or corresponding parts, and particularly to FIGS. 1 and 1a, a conventional touch screen as taught by the prior art comprises a top substrate 2 and a bottom substrate 4, which are arranged in planes parallel to one another (see FIG. 1a). Each substrate is coated with a resistive material such that opposed layers or regions 3,5 of uniform resistance are provided. When the touch screen is depressed at a point in its active area, i.e., the area over which the resistance layers overlap, top resistance layer 3 is flexed into contact with bottom resistance layer 5. In this manner, each substrate is adapted to report the location of the contact point. That is, if the resistance of the coating of each layer is uniform and undamaged, a linear drop in voltage will occur across each resistance layer and by measuring the voltage at the contact point, the X (horizontal) and Y (vertical) coordinate of the location of the contact point can be determined as described below.

Top substrate 2, which facilitates the report of the Y coordinate, includes two parallel lines formed of conductive material 8,10, such as conductive silver ink. As illustrated in FIG. 1, conduction line 8 is printed along the upper edge of top substrate 2 and conduction line 10 is printed along the lower edge of top substrate 2.

Bottom substrate 4, which facilitates the report of the X coordinate, also includes two parallel lines formed of conductive material 14,16 printed with conductive silver ink thereon. As illustrated in FIG. 1, conduction line 14 is printed along the right vertical edge of bottom substrate 4 and conduction line 16 is printed along the left vertical edge of bottom substrate 4.

When the substrates are assembled in an overlapping relationship to form the touch screen, conduction lines 8,10 of top substrate 2 extend in a generally perpendicular direction to conduction lines 14,16 of bottom substrate 4 (see FIG. 1a).

Digital to Analog circuitry is provided to continuously apply a voltage first to one substrate, and then to the other substrate through their respective conduction lines. Specifically, as shown in FIG. 1, a digital-to-analog (D/A) converter 18 provides voltage to each substrate via conduction lines 8 and 14. With this configuration, the resistance layer 3,5 of each substrate 2,4 serves as a voltage divider, allowing a linear voltage drop across each layer. An analog-to-digital (A/D) converter 20 is used to read the voltage drops at the contact point and convert them into X and Y coordinates.

When voltage is applied to top substrate 2 (i.e., the Y layer) at conduction line 8 via D/A converter 18 and a touch occurs on the touch screen, the voltage drop at the contact point is read off bottom substrate 4 by A/D converter 20 at conduction line 16 such that the Y coordinate is determined.

Similarly, when voltage is applied to bottom substrate 4 (i.e., the X layer) at conduction line 14 via D/A converter 18 and a touch occurs on the touch screen, the voltage drop at the contact point is read off top substrate 2 by A/D converter 20 at conduction line 10 such that the X coordinated is determined.

Therefore, resistance layers 3,5 each act as a voltage divider in determining the voltage drops at the contact point and hence, the X and Y coordinates of the contact point are thereby determined.

Figure 2:
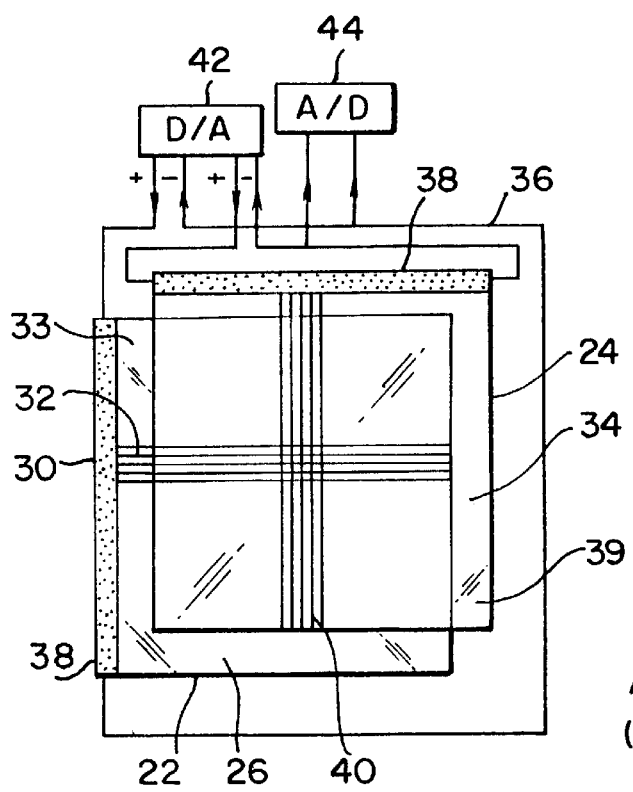
FIG. 2 is a schematic diagram of another conventional touch screen of the voltage-divider type having an active area defined by a pair of opposed conductive layers as provided by the prior art.

Another touch screen of the voltage-divider type as taught by the prior art is depicted in FIG. 2. In contrast to the conventional touch screen discussed above, the active area of the touch screen is formed by a pair of opposed regions or layers formed of conductive material and the resistive material that acts as the voltage divider in determining the location of the contact point is reduced in size and situated at one edge of each conductive layer in an inactive area of the touch screen.

Top substrate 22 (which facilitates the report of the Y coordinate) and bottom substrate 24 (which facilitates the report of the X coordinate) each comprise a single resistance strip 30,38, respectively, situated along an edge of a conductive region or layer. Resistance strips 30,38 are formed of durable resistors. The conductive regions or layers are formed by parallel, closely spaced conductive strips 32,40 formed by etching and extending perpendicular to resistance strips 30,38, respectively. Conductive strips 32,40 are coupled to the resistance strips with additional conductive ink and extend across the entire substrates. Conductive strips 32,40 are preferably strips of ITO (indium tin-oxide). Conductive layer 33 on top substrate 22 faces conductive layer 39 on bottom substrate 24 in an overlapping relationship such that resistance strip 30 extends in a generally perpendicular direction to resistance strip 38.

D/A circuitry is provided by which voltage is continuously "switched" between substrates 22,24 through resistance strips 30,38, respectively. Specifically, as shown in FIG. 2, a D/A converter 42 provides voltage to each substrate via one end of resistance strips 30,38 (instead of applying the voltage to one side of each resistance layer). As such, resistance strips 30,38 act as the voltage dividers instead of the resistance layers of the conventional prior art touch screen. A/D converter 44 and conventional processing circuitry and software (not shown), similar to that used in the conventional touch screen, is used to read the voltage drops at the contact point and convert them into X and Y coordinates.

It is noted that conductive strips 32,40 extend across the entire length and width of each layer and are coupled to each resistance strip substantially along the entire length of said resistance strip. Thus, FIG. 2 only shows a portion of those conductive strips etched on the surface of the conduction layers at a distance apart not drawn to scale.

When voltage is applied to top substrate 22 at one end of resistance strip 30 via D/A converter 42 and a touch occurs on the touch screen, the voltage drop at the contact point is read off bottom substrate 24 by A/D converter 44 at resistance strip 38 such that a voltage indicative of the Y coordinate is determined. The X coordinate is determined in a similar fashion as described above with regards to the Y coordinate. When voltage is applied to bottom substrate 24 at one end of resistance strip 38 via D/A converter 42 and a touch occurs on the touch screen, the voltage drop at the contact point is read off top substrate 22 by A/D converter 44 at resistance strip 30 such that a voltage indicative of the X coordinate is determined.

Conventional processing techniques are then used to convert these digital values to X and Y coordinates.

In contrast to conventional prior art touch screens, in accordance with the prior art touch screen of FIG. 2, the active area of the touch screen (i.e., the area over which the conductive layers overlap) is comprised of a conductive material having a negligible resistance, and the resistive material which acts as the voltage divider is located outside the perimeter of the active area. The conventional touch screens, in which the active area of the screen comprises a layer having a substantial resistivity which serves as a voltage divider, are susceptible to malfunctions in that the screen's life and the positional accuracy of the screen are dependent upon the maintenance of the resistance of each layer. The prior art touch screen of FIG. 2 remains troublesome, however, due to the fact that physical abuse directed toward the active area of the screen can cause one or more of the conductive strips to separate from the resistance strip, thus rendering the screen useless. That is, if the active area of the touch screen of this prior art touch screen is scratched slightly during manufacture or if the screen is cut, the screen will cease to function because the conductive strips in the damaged area will be disconnected from the resistance strip.

In accordance with the present invention, the above-referenced deficiencies of the prior art are overcome. Referring to FIGS. 3 and 4, in which elements corresponding to elements of the prior art device shown in FIG. 2 are designated by the same reference elements in the one hundred series, additional resistance strips 50,52 have been added to the top and bottom substrates of the touch screen, respectively.

In accordance with an embodiment of the present invention, top substrate 122 and bottom substrate 124 each comprise a pair of resistance strips 50,130 and 52,138, respectively. The resistance strips are situated on two opposing edges of each conductive region or layer such that when the substrates are arranged in an overlapping relationship, the resistance strips of top substrate 122 extend in a generally perpendicular direction to the resistance strips of bottom substrate 124. The conductive regions or layers 133,139 are formed by a plurality of parallel, closely spaced conductive strips 132,140 (preferably strips of ITO), respectively, which are formed by etching across top substrate 122 and bottom substrate 124, respectively. The conductive strips are coupled at their ends to the resistance strips of each substrate. D/A converter 142 is provided to apply a reference voltage across resistance strips 50, 130 while a voltage indicative of a first coordinate (e.g., the Y coordinate) is read from the second substrate 124. The D/A converter 142 then applies the reference voltage across the resistance strips 52, 138 of the second substrate 124 while a voltage indicative of a second coordinate (e.g., the X coordinate) is read from the first substrate 122. In accordance with a further embodiment of the present invention, the D/A converter continuously toggles the applied voltage between the two substrates.

The top and bottom substrates are preferably formed from polyester and are typically about 0.007 inches thick whereas the resistance strips of each substrate are preferably formed from graphite-based inks and have resistances ranging from about 100 ohms to about 10,000 ohms, depending on the geometric configuration of the resistance strips. The graphite-based inks forming the resistance strips typically have volume resistances ranging from one ohm/sq./mil. to 40 ohms/sq./mil. However, the substrates and resistance strips may be formed from any other material known in the art which demonstrates similar characteristics to those set forth above. Similarly, while the present invention has been described above with regard to D/A and A/D converters, it should be clear that the voltage can be applied to and read from the substrates utilizing other conventional circuitry.

The conductive strips 132,140 are more clearly illustrated in FIG. 4 where it is shown that the conductive strips extend along the entire length and width of each layer. The strips are formed by etching whereby non-conduction gaps, typically 0.015 inches wide, are formed between the conductive strips. The distance from the center of one strip to the center of an adjacent strip can be as small as 0.03 inches.

In the present invention, the X and Y coordinates of a touch on the screen are determined in a similar fashion as in the prior art device discussed above. In accordance with the embodiment of the present invention shown in FIG. 4, however, when D/A converter 142 applies voltage to top substrate 122 (in determining the Y coordinate) and a touch P occurs on the touch screen, the current travels along both resistance strips 50,130 in parallel a distance of YR1 to a point laterally adjacent to contact point P (the voltage drop at this point is used to determine the Y coordinate). At that point, the voltage drop at the contact point is read off bottom substrate 124 by A/D converter 144 at each resistance strip 52,138 such that the Y coordinate is determined.

To determine the X coordinate, D/A converter 142 applies voltage to bottom substrate 124 (in determining the X coordinate) and the current travels along both resistance strips 52,138 in parallel a distance of XR1 to a point laterally adjacent to the contact point P (the voltage drop at this point is used to determine the X coordinate). At that point, the voltage drop at the contact point is read off top substrate 122 by A/D converter 144 at each resistance strip 50,130 such that the X coordinate is determined.

The voltage applied is typically about 5 volts and the voltage is preferably switched between the top and bottom substrates at a speed of about 5 microseconds.

The addition of resistance strips 50,52 to top substrate 122 and bottom substrate 124, respectively, provides the ability to endure scratches on the active conductive layers which damage the conductive strips. If a conductive strip is separated from one of the resistance strips, the current will still flow to the other resistance strip to which the conductive strip is still attached. With this arrangement, a touch screen can be damaged so that discontinuities exist at one or more locations on the conductive regions but will still operate without losing positional accuracy of the contact point.

Obviously, numerous modifications and variations of the present invention are possible in light of the teachings hereof Therefore, it is to be understood that the invention can be varied from the detailed description above within the scope of the claims appended hereto.

What is claimed is:

1. A touch screen, comprising:

a first and second substrate, said first substrate being spaced apart from said second substrate by a gap, a pair of regions formed of conductive material formed on said first and second substrates respectively, in overlapping relationship, a pair of strips formed from a resistive material coupled to opposed edges of each conductive region such that said resistance strips of said first substrate extend in a substantially perpendicular direction to said resistance strips of said second substrate, a circuit which applies a first reference voltage across the resistance strips of the first substrate, and subsequently applies a second reference voltage across the resistance strips of the second substrate, said circuit being structured and arranged to calculate an X coordinate based on a voltage drop across each resistance strip of said first substrate independent of a voltage drop across the other resistance strip of said first substrate and being structured and arranged to calculate a Y coordinate based on a voltage drop across each resistance strip of said second substrate independent of a voltage drop across the other resistance strip of said second substrate.

2. The touch screen according to claim 1, wherein the first reference voltage equals the second reference voltage.

3. The touch screen according to claim 1, wherein said pair of regions formed of conductive material comprise a plurality of conductive strips coupled at their ends to said resistance strips of their respective substrates.

4. The touch screen according to claim 1, wherein said conductive region of said first substrate faces said conductive region of said second substrate.

5. The touch screen according to claim 1, wherein said circuit includes digital-to-analog circuitry for applying said first and second reference voltages to said resistance strips of said first and second substrates respectively.

6. The touch screen according to claim 5, wherein said digital-to-analog circuitry continuously toggles said applied reference voltages between said resistance strips of said first and second substrates.

7. The touch screen according, to claim 6, wherein said digital-to-analog circuitry toggles said applied voltage approximately every 5 microseconds.

8. The touch screen according to claim 1, wherein said conductive strips are formed from a material chosen from the group consisting of indium tin-oxide and conductive silver ink.

9. The touch screen according to claim 1, wherein said first conduction region and said second conduction region are formed from graphite.

10. The touch screen according to claim 1, wherein said first substrate and said second substrate are about 0.007 inches thick.

11. The touch screen according to claim 1, wherein each resistance strip of said first and second substrates have a resistance ranging from about 100 ohms to about 10,000 ohms.

12. The touch screen according to claim 1, further comprising a circuit which measures a voltage of said second substrate when said first reference voltage is applied across said resistance strips of said first substrate, and measures a voltage of said first substrate when said second reference voltage is applied across said resistance strips of said second substrate.

13. A touch screen, comprising:

a first rectangular conductive region having an active area of a negligible resistance adapted to be touched and an inactive area situated on the perimeter of said active area, said first conductive region being coupled to a first pair of resistance strips, each resistance strip of said first pair being arranged along a vertical edge of said first conductive region in said inactive area, a second rectangular conductive region having an active area of a negligible resistance and an inactive area situated on the perimeter of said active area, said second conductive region situated in a plane parallel to said first conductive region, said second conductive region being coupled to a second pair of resistance strips, each resistance strip of said second pair being arranged along a horizontal edge of said second conductive region in said inactive area, and a circuit which applies a first reference voltage across said resistance strips of said first substrate, and subsequently applies a second reference voltage across said resistance strips of said second substrate, said circuit being structured and arranged to calculate an X coordinate based on a voltage drop across each resistance strip of said first substrate independent of a voltage drop across the other resistance strip of said first substrate and being structured and arranged to calculate a Y coordinate based on a voltage drop across each resistance strip of said second substrate independent of a voltage drop across the other resistance strip of said second substrate.

* * * * *